3,149,145
PROCESS FOR PRODUCTION OF ALKYL PHOS-
PHONOUS ACID DIESTERS AND DIAMIDES
Clarence W. Huffman, Glenview, and Martin Hamer,
Chicago, Ill., assignors to International Minerals &
Chemical Corporation, a corporation of New York
No Drawing. Filed Sept. 13, 1962, Ser. No. 223,513
17 Claims. (Cl. 260—461)

This invention relates to the preparation of alkyl phosphonous acid derivatives. In one of its aspects, this invention relates to an improved method for preparing alkyl phosphonite esters. In another of its aspects, this invention relates to a method for the preparation of amides of alkyl phosphonous acids.

In the past few years there has been a tremendous amount of work done in the field of organic phosphorous compounds, particularly in the field of esters and amides of the various acids of phosphorus. These compounds have shown themselves to be quite versatile in their end uses. For example, they can be employed in insecticidal, fungicidal and germicidal formulations, as plasticisers, as ingredients in gasoline, lubricating oil and fuel oil additives, and for many other uses. In the case of derivatives of alkyl phosphonous acids, these derivatives are antioxidant in character and may be used not only because of this useful property, but also as intermediates in the preparation of the derivatives of phosphonic acid which have a higher valent state for the phosphorus. Although the knowledge of the utility of organic phosphorus compounds has expanded, the commercialization of other than phosphates has not been extensive. This is due mainly to a matter of economics, but the economics are adverse by virtue of processes which offer difficulty and low yields.

In the preparation of organic phosphorus compounds it is a known procedure to use as a starting material a phosphorus trihalide and to introduce an organic radical by replacement of the halogen atoms attached to the phosphorus through carbon, oxygen, sulphur, or nitrogen linkages. Clay, for example, disclosed the reaction of PCl$_3$ with RCl in the presence of aluminum chloride to form the complex (RPCl$_3$)$^+$(AlCl$_4$)$^-$ which is then further reacted with water to form RPOCl$_2$. J. Org. Chem., 16, 892 (1951). When the R happens to be a long chain hydrocarbon radical the compound RCl becomes expensive and difficult to prepare. The Russian workers, Okhlobystin and Zakharkin, have reported the reaction of PCl$_3$ with a trialkyl aluminum to form a mixture containing phosphines of varying degrees of organic substitution. Izvest. Akad. Nauk SSSR, 1007–8 (1958). U.S. Patent No. 3,036,132 to Becker makes a similar disclosure, although Becker was concerned primarily with reacting phosphorus trihalides with alkali metal aluminum organic compounds.

As pointed out, very often the intermediate reaction products must be isolated and purified before they can be used further in the preparation of said derivatives. This, of course, involves tedious separation and purification problems which incur material losses and which usually deter commercial adoption unless the final product commands a price adequate to insure a reasonable profit.

In accordance with the present invention we have discovered a method for the preparation of ester and amide derivatives of alkyl phosphonous acids which involves the use of readily available raw materials and involves a minimum of intermediate purification steps. In our process we react a trialkyl aluminum with a phosphorus trihalide according to the equation:

$$AlR_3 + 3PX_3 \rightarrow (RPX)^+(AlX_4)^- + 2RPX_2$$

In the above equation R is an alkyl radical having from 2 to 24 carbon atoms and X is a halide selected from the group consisting of chlorine, bromine and iodine. The reaction is conducted in the absence of molecular oxygen and moisture and preferably in the presence of an inert anhydrous solvent medium. We have found that the aluminum halide complex and free alkyl dihalophosphine formed in the above reaction need not be isolated before conversion to desirable derivatives. That is, we have found that the complexed form in admixture with the free phosphine can be converted to esters and amides as a mixture and the desirable organic derivative recovered at the end of the process after splitting off of the aluminum halide from the complex. Thus, it can be seen immediately, that this discovery eliminates tedious and costly intermediate separation steps and permits carrying out the entire process from beginning to end with a minimum of material transfers.

It is, therefore, an object of the present invention to provide an improved method for the preparation of derivatives of alkyl phosphonous acids.

It is another object of this invention to provide an improved method for the preparation of esters of alkyl phosphonous acids.

It is a further object of this invention to provide an improved method for preparing amide derivatives of alkyl phosphonous acids.

Additional objects of the present invention will be apparent from the description as follows.

In the practice of the present invention, the first step in the method involves carrying out the reaction between a trialkyl aluminum and phosphorus trihalide. According to the equation:

$$AlR_3 + 3PX_3 \rightarrow (RPX)^+(AlX_4)^- + 2RPX_2$$

In the above formula X is a halide selected from the group consisting of chlorine, bromine and iodine. The preferred halide is chlorine because of its ready availability and low cost. R is an alkyl hydrocarbon radical having from 2 to 24 carbon atoms. Examples of the alkyl radicals denoted by R include ethyl, propyl, butyl, pentyl, hexyl, heptyl, octyl, nonyl, decyl, undecyl, dodecyl, tridecyl, tetradecyl, hexadecyl, octadecyl, and eicosyl. All of the R's may be alike, as for example in triethylaluminum and trioctylaluminum, or they may be mixed alkyl radicals, for example, as in octyl, decyl, tetradecylaluminum, and the like. Preferred trialkyl aluminums include triethylaluminum, trioctylaluminum and mixed alkyl trialkyl aluminums. Trialkyl aluminums are readily available commercial commodities available from such sources as Continental Oil Company and Texas Alkyls, Inc.

Since the reactants and the products react readily with oxygen and water in the atmosphere, it is necessary to effect reaction with the exclusion of these materials and also other reactive materials. The reaction may be effected under an atmosphere of nitrogen, helium, argon, or other inert gas. The reaction is exothermic and can be effected over a broad temperature range, generally between about —50° C. and up to about 100° C. and higher if means are taken to remove the volatile materials. It is generally desirable, although not absolutely essential, to employ inert solvents or diluents in the reaction zone where they function to dissolve reacting materials and products and to absorb some of the heat released during the reaction. Especially useful solvents or diluents include unreactive hydrocarbons such as the saturated hydrocarbons and the aromatic hydrocarbons. Suitable saturated hydrocarbons, solvents or diluents include the alkanes such as pentanes, hexanes, or higher boiling alkanes such as n-heptane, octane, dodecane, mineral oil, or the like; cycloalkanes such as cyclopentane, cyclohexane, and alkyl substituted cycloalkanes; aromatic hydrocarbons such as benzene and alkylbenzenes such as toluene and xylene, naphthalene, methylnaphthalenes; chlorinated alkanes such as ethylene dichloride, methylene dichloride, and the like. The specific solvents are chosen with regard to their solvent ability and to the particular reaction conditions which are selected so that the solvent or diluent will be employed in the liquid or liquid-vapor mixture in the reaction zone. The reaction may be effected at atmospheric pressure or superatmospheric pressures. Ordinarily the reaction in question does not proceed with substantial pressure change, so that the selection of desired pressure is based principally upon physical considerations involved in the reaction, as for example, the boiling point of the reaction solvent or diluent.

Because the desired organic phosphorus compound is a monoalkyl derivative, the ratio of phosphorus trihalide to aluminum alkyl is at least 3 to 1. Under these conditions there is generally little, if any, secondary or tertiary substitution of the phosphorus atom. While a slight excess is desirable, a large excess of phosphorus trihalide should be avoided in order to minimize contamination on further reaction in the preparation of the desired derivative.

In a specific illustrative embodiment of the first step in the practice of our invention, one mole proportion of triethylaluminum is dissolved in dry benzene and added under a nitrogen blanket to a solution containing about three mole proportions of $PCl_3$ dissolved in dry benzene, over a period of about 30 minutes to about an hour at a temperature between about 20 and 50° C. After addition of the triethylaluminum, stirring at the same temperature is continued for a period of from about 30 minutes to about 3 hours. The product of this reaction is a mixture containing about one mole proportion of an aluminum chloride-ethyldichlorophosphine complex and about two mole proportions of ethyldichlorophosphine.

In accordance with our invention the mixture of aluminum halide complex and free halophosphine can be converted to an alkyl phosphonite ester by treating the reaction mixture with about six mole proportions of an organic monohydroxy compound. The presence of an anhydrous tertiary amine acid acceptor such as pyridine or triethylamine, or the like, is advantageous. The organic monohydroxy compound is represented by the formula R'OH wherein R' is an organic radical selected from the group consisting of aliphatic hydrocarbon, cycloaliphatic hydrocarbon, aromatic hydrocarbon, mixed aliphatic-aromatic hydrocarbon such as alkaryl and aralkyl groups, and alkyl oxyalkylene. The hydrocarbon radicals may be saturated or unsaturated and substituted or unsubstituted, but when substituted they must be substituted with inert functional groups; those groups which will not interfere with the reaction between the hydroxyl group and the halogen from the alkyl dihalophosphine. Illustrative examples of R' include methyl, ethyl, propyl, isopropyl, butyl, amyl, hexyl, octyl, dodecyl, hexadecyl, octadecyl, and the like; olefinic and acetylenic analogs of the foregoing; cyclohexyl, cyclopentyl, methylcyclohexyl, phenyl, cresyl, xylyl, naphthyl, methylnaphthl, ethylnaphthyl, methoxyethyl, ethoxyethyl, methylpolyoxyethyl, methoxypropyl, ethylpolyoxypropyl, and the like. It will be appreciated that if mixed esters are desired, a mixture of organic monohydroxy compounds can be employed in the esterification reaction.

The esterification reaction is carried out in an anhydrous medium, and the reaction product is a mixture of the desired ester as the aluminum halide complex and the free phosphonite ester. The desired ester can be recovered from this mixture by treatment with water to break the aluminum halide complex. When this is done the aluminum halide forms a hexahydrate which first appears as a precipitate and which will dissolve as more water is added. The organic compound may be separated from either the precipitate or from the aqueous phase and readily recovered therefrom and worked up in conventional ways.

In an illustrative embodiment, dioctyl ethylphosphonite is prepared by first reacting triethylaluminum with $PCl_3$ as described hereinbefore. The reaction product contains aluminum chloride-ethyldichlorophosphine complex and free ethyldichlorophosphine which is then treated with at least six mole proportions of anhydrous octyl alcohol. Additionally, at least six mole proportions of pyridine are present in order to take up the HCl formed in the esterification reaction. The reaction mixture is treated with water after the completion of the reaction, and the organic phase containing the dioctyl ethylphosphonite separated, and the solvent removed.

In the preparation of amide derivatives from the reaction mixture resulting from the reaction between aluminum trialkyl and phosphorus trihalide, the reaction mixture is treated with at least six mole proportions of an organic monoamine having the formula $R''_2NH$, and preferably about twelve mole proportions of said monoamine to accommodate the HX formed in the reaction which is taken up by the free amine reactant, thus rendering said amine unavailable for reaction with the halogen group attached to the phosphorus atom. $R''_2NH$ is an organic monoamine of less than tertiary substitution wherein R'' is selected from the group consisting of aliphatic hydrocarbon, cycloaliphatic hydrocarbon, aromatic hydrocarbon, mixed aliphatic-aromatic hydrocarbon, divalent heterocyclic wherein N of the amine is included in the heterocyclic nucleus, and hydrogen, not more than one R'' being hydrogen. The hydrogen radicals may be saturated or unsaturated and substituted or unsubstituted, but when substituted the substituted group must be inert to the reaction between the amine and the halophosphine. Thus, the amine may not contain hydroxyl groups which would also react with the halogen in the phosphine.

Specific illustrations of R'' are identical with those given for R' of the R'OH formula described hereinbefore with the exception of the alkyl oxyalkylene illustrations which are omitted for the monoamine. Specific examples of heterocyclic amines include morpholine, substituted morpholine, piperidine, substituted piperidine, pyrrolidine, and the like. Preferred amines are alkyl secondary amines having from 1 to 18 carbon atoms, such as dimethyl amine, diethyl amine, dibutyl amine, hexyl amine, dioctyl amine, didodecyl amine, dioctadecyl amine, N-methylaniline and the like.

In an illustrative embodiment, ethylphosphonous acid bis (diethyl amide) is prepared by first reacting triethylaluminum with $PCl_3$ in the manner described hereinbefore. The reaction product is then treated below about 50° C. with about twelve mole proportions of diethylamine to form a reaction mixture containing aluminum chloride-ethylphosphonous acid bis-(diethyl amide) complex and free ethylphosphonous acid bis-(diethyl amide). The reaction mixture is then treated with water and the ethylphosphonous acid bis (diethyl amide) organic phase is separated and the solvent removed. The product is then worked up in conventional ways.

The phosphonite esters and amides formed in accordance with the practice of this invention can be readily converted to phosphonate derivatives by treatment with a chalcogen donor capable of effecting oxidation to the higher valent state. Examples of such compounds include molecular oxygen or sulphur, the latter being employed when the thiophosphonate derivative is the desired compound.

The following examples are intended to illustrate the underlying principles of the present invention and are not to be construed as unduly limiting thereof. The yields reported are based on the trialkyl aluminum employed.

*Example 1.—Dioctyl Ethylphosphonite*

Triethylaluminum, 11.6 g. (0.10 mole), dissolved in 80 ml. of benzene, was added to phosphorous trichloride, 41.2 g. (0.30 mole), in 150 ml. of benzene at 35 to 45° C. in one hour under nitrogen. The flask contents were heated at the same temperature for another one hour. The product was cooled in an ice bath and a mixture of 1-octanol, 86.0 g. (0.66 mole), and triethylamine, 66.8 g. (0.66 mole), were added in 75 minutes at 5 to 15° C. The thick mixture was stirred at the same temperature for an additional one hour. Water, 100 g., was added and the flask contents stirred at below 25°. The aqueous layer was separated and the organic layer washed several times with cold water. The benzene was stripped from the organic layer under vacuum, and the residual material was vacuum distilled, heating to a maximum of 180° at 0.05 mm. The excess octanol was distilled off from the product, leaving 17.6 g. (18%) of dioctyl ethylphosphonite, a colorless oil, $n_D^{28}$ 1.4443.

Example 2.—Di-p-Cresyl Ethylphosphonite

Triethylaluminum, 11.6 g. (0.10 mole), dissolved in 80 ml. of benzene was added to phosphorous trichloride, 41.2 g. (0.30 mole), in 150 ml. benzene in one hour at 35 to 45° C. under nitrogen. The reaction mixture was heated another one hour at the same temperature. Para-cresol, 77.8 g. (0.72 mole), in 100 ml. of benzene, was added and the mixture heated at reflux for 10 hours. The product was treated with 100 ml. portions of water three times at 15 to 25°, and then washed with 5% sodium hydroxide and then 5% potassium hydroxide in 50% aqueous ethanol. After water-washing until neutral, the solvent was stripped from the organic layer under vacuum. The residue was vacuum distilled under nitrogen. The fraction containing the di-p-cresyl ethylphosphonite was collected from 130 to 209° at 0.10–0.30 mm., $n_D^{28}$ 1.5583. An infrared spectrum of this cut showed the material to be mostly di-p-cresyl ethylphosphonite.

Example 3.—Di-p-Cresyl Mixed-Alkylphosphonites

This preparation was carried out as in Example 2, using 66% active mixed-alkyl trialkylaluminum in a hydrocarbon solvent (Continental Oil Company), 66.8 g. (0.10 mole). After the washings and removal of the solvents by distillation, 30.0 g. (42%) of a light yellow liquid remained which congealed to a soft wax, melting just above room temperature. The infrared spectrum of this product indicated that it was di-p-cresyl alkylphosphonite.

Example 4.—Ethylphosphonous Acid Bis-(N,N'-Diethylamide)

Triethylaluminum, 0.10 mole, is dissolved in 100 ml. of benzene and added to phosphorous trichloride, 0.30 mole, in 200 ml. of benzene at 35 to 45° C. in one hour under nitrogen. The reactants are stirred another hour at the same temperature and then cooled. Diethylamine, 1.2 moles, in 150 ml. of benzene, is added while maintaining the temperature at 10 to 20° C. Stirring is continued for another two hours at the same temperature, and the product is treated with water below 25°. The aqueous layer is removed and the organic layer washed several times with water. The solvent is removed from the organic layer and the residue vacuum distilled, to give ethylphosphonous acid bis-(N,N'-diethylamide).

Example 5.—Alkylphosphonous Acid Bis-(N,N'-Methyl-N,N'-Phenylamide)

This preparation is carried out as in Example 4, using a mixed-alkyl trialkylaluminum of average molecular weight 390 (Continental Oil Company), 0.10 mole, in place of triethylaluminum. The amine used is N-methylaniline. The product from the reaction is alkylphosphonous acid bis-(N,N'-methyl-N,N'-phenylamide).

While this invention has been described in terms of its preferred embodiments and modifications, it will be appreciated that changes can be made without departing from the spirit and scope of the invention.

We claim:
1. A method for the preparation of monoalkyl phosphonous acid derivatives selected from the group consisting of monoalkyl phosphonous acid diesters and monoalkyl phosphonous acid diamides which comprises reacting in an anhydrous medium in the absence of molecular oxygen one mole proportion of an aluminum trialkyl having the formula AlR₃ wherein R is an alkyl group having from 2 to 24 carbon atoms with at least 3 mole proportions of a phosphorus trihalide having the formula PX₃ wherein X is selected from the group consisting of chlorine, bromine, and iodine to produce a reaction mixture containing aluminum halide-monoalkyldihalophosphine complex and free monoalkyl dihalophosphine; reacting the thus-obtained reaction mixture with at least 6 mole proportions of a compound selected from the group consisting of organic monohydroxy compounds having the formula R'OH and monoamines of less than tertiary substitution having the formula R''₂NH, wherein in said first formula R' is a radical selected from the group consisting of aliphatic hydrocarbon, cycloaliphatic hydrocarbon, aromatic hydrocarbon, and alkyl oxyalkylene, and in said second formula R'' is a radical selected from the group consisting of aliphatic hydrocarbon, cycloaliphatic hydrocarbon, aromatic hydrocarbon, divalent heterocyclic wherein the N atom is part of the heterocyclic nucleus, and hydrogen, no more than one R'' being hydrogen to form a reaction mixture containing aluminum halide-phosphonous acid derivative complex and free phosphonous acid derivative; treating the thus-obtained reaction mixture with water to break the aluminum halide complex; and recovering from the reaction mixture a monoalkyl phosphonous acid derivative selected from the group consisting of corresponding monoalkyl phosphonous acid diesters and corresponding monoalkyl phosphonous acid diamides.

2. A method according to claim 1 wherein X is chlorine.

3. A method according to claim 1 wherein AlR₃ is triethylaluminum.

4. A method according to claim 1 wherein AlR₃ is a mixed-alkyl trialkyl aluminum.

5. A method for the preparation of a monoalkyl phosphonite diester which comprises reacting in an anhydrous medium in the absence of molecular oxygen one mole proportion of a trialkylaluminum having the formula AlR₃ wherein R is an alkyl group having from 2 to 24 carbon atoms with at least 3 mole proportions of PCl₃ to form a reaction mixture containing aluminum chloride-monoalkyldichlorophosphine complex and free monoalkyldichloro phosphine; treating the thus-obtained reaction mixture with at least 6 mole proportions of an organic monohydroxy compound having the formula R'OH wherein R' is a radical selected from the group consisting of aliphatic hydrocarbon, cyclo aliphatic hydrocarbon, aromatic hydrocarbon, and alkyl oxyalkylene to produce a reaction mixture containing aluminum chloride-monoalkyl phosphonite diester complex and free monoalkyl phosphonite diester; treating the thus-obtained reaction mixture with water to break the aluminum chloride complex; and recovering from the reaction mixture monoalkyl phosphonite diester.

6. A method according to claim 5 wherein X is chlorine.

7. A method according to claim 5 wherein AlR₃ is triethylaluminum.

8. A method according to claim 5 wherein AlR₃ is a mixed-alkyl trialkyl aluminum.

9. A method according to claim 5 wherein R' is an alkyl hydrocarbon radical having from 1 to 18 carbon atoms.

10. A method according to claim 5 wherein R' is a monocyclic aryl hydrocarbon radical.

11. A method for the preparation of dioctyl ethylphosphonite which comprises reacting in an anhydrous medium in the absence of molecular oxygen one mole proportion of triethylaluminum with at least 3 mole proportions of PCl₃ to produce a reaction mixture containing aluminum chloride-ethyl dichlorophosphine complex and free ethyl dichlorophosphine; treating the thus-obtained reaction mixture with at least 3 mole proportions of octyl alcohol in the presence of a tertiary amine acid acceptor to form a reaction mixture containing aluminum chloride-dioctyl ethylphosphonite complex plus free dioctyl ethylphosphonite; treating the thus-obtained reaction mixture with water to break the aluminum chloride complex; and recovering from the reaction mixture dioctyl ethylphosphonite.

12. A method for the preparation of a monoalkyl phosphonous acid diamide which comprises reacting in an anhydrous medium in the absence of molecular oxygen one mole proportion of a trialkyl aluminum having the formula $AlR_3$ wherein R is an alkyl radical having from 2 to 24 carbon atoms with at least 3 mole proportions of a phosphonous trihalide having the formula $PX_3$ wherein X is selected from the group consisting of chlorine, bromine, and iodine, to produce a reaction mixture containing aluminum halide-monoalkyl phosphine dihalide complex and free monoalkyl dihalophosphine; treating the thus-obtained reaction mixture, in the presence of an anhydrous amine acid acceptor, with at least 6 mole proportions of an organic monoamine having the formula $R''_2NH$ wherein $R''$ is a radical selected from the group consisting of aliphatic hydrocarbon, cycloaliphatic hydrocarbon, aromatic hydrocarbon, divalent heterocyclic wherein the N atom of the monoamine is part of the heterocyclic nucleus, and hydrogen, no more than one $R''$ being hydrogen, to produce a reaction mixture containing aluminum halide-monoalkyl phosphonous acid diamide complex and free monoalkyl phosphonous acid diamide; treating the thus-obtained reaction mixture with water to break the aluminum halide complex; and recovering from the mixture monoalkyl phosphonous acid diamide.

13. A method according to claim 12 wherein X is chlorine.

14. A method according to claim 12 wherein $AlR_3$ is triethylaluminum.

15. A method according to claim 12 wherein $AlR_3$ is a mixed-alkyl trialkyl aluminum.

16. A method according to claim 12 wherein $R''$ is an alkyl hydrocarbon radical having from 1 to 18 carbon atoms.

17. A method for the preparation of ethylphosphonous acid bis-(diethyl amide) which comprises reacting in anhydrous benzene in the absence of molecular oxygen one mole proportion of triethylaluminum with at least 3 mole proportions of $PCl_3$ to form a reaction mixture containing aluminum chloride-ethyl dichlorophosphine complex and free ethyl dichlorophosphine; treating the thus-obtained reaction mixture with at least 12 mole proportions of diethyl amine to form a reaction mixture containing aluminum chloride-ethyl phosphonous acid bis-(diethyl amide) complex and free ethyl phosphonous acid bis-(diethyl amide); treating the thus-obtained reaction mixture with water to break the aluminum chloride complex; and recovering therefrom ethyl phosphonous acid bis-(diethyl amide).

References Cited in the file of this patent
UNITED STATES PATENTS

| | | |
|---|---|---|
| 2,137,792 | Woodstock | Nov. 22, 1938 |
| 3,036,132 | Becker | May 22, 1962 |